United States Patent [19]

Hanway, Jr.

[11] 3,738,289

[45] June 12, 1973

[54] COUNTER-FLOW SLUDGE BURNER

[75] Inventor: John E. Hanway, Jr., Naperville, Ill.

[73] Assignee: Chicago Bridge & Iron Company, Aurora, Ill.

[22] Filed: Aug. 16, 1971

[21] Appl. No.: 172,020

[52] U.S. Cl. .................................. 110/8 R, 110/7 S
[51] Int. Cl. ............................................. F23g 5/12
[58] Field of Search ..................... 110/7 R, 7 S, 8 R, 110/8 A, 8 C

[56] References Cited
UNITED STATES PATENTS

| 3,563,187 | 2/1971 | Zanft | 110/7 |
| 3,395,654 | 8/1968 | Weisberg et al. | 110/8 |
| 3,357,375 | 12/1967 | Brophy | 110/7 |
| 3,362,360 | 1/1968 | Lowe | 110/7 |
| 3,322,079 | 5/1967 | Komline et al. | 110/8 |

Primary Examiner—Kenneth W. Sprague
Attorney—Darbo, Robertson & Vandenburgh

[57] ABSTRACT

Waste-treatment sludge from which water has been largely removed is dispersed downwardly in an upwardly flowing atmosphere within a firebox where the temperature is maintained sufficiently high to dry and burn the sludge while it is in free falling condition, and ash and other products of combustion escaping upwardly to a gas scrubber and ash separator, with relatively clean gas being discharged to the atmosphere. The firebox is preheated by a burner at the bottom thereof. As necessary to maintain the required temperature, there is further burning of fuel at this burner or by addition to the sludge feed. Addition to fuel oil to the sludge before pumping the sludge facilitates pumping, and achieves mixing. Supplementary air is fed at bottom and somewhat tangentially, to impart rotation to the gases within the firebox.

8 Claims, 3 Drawing Figures

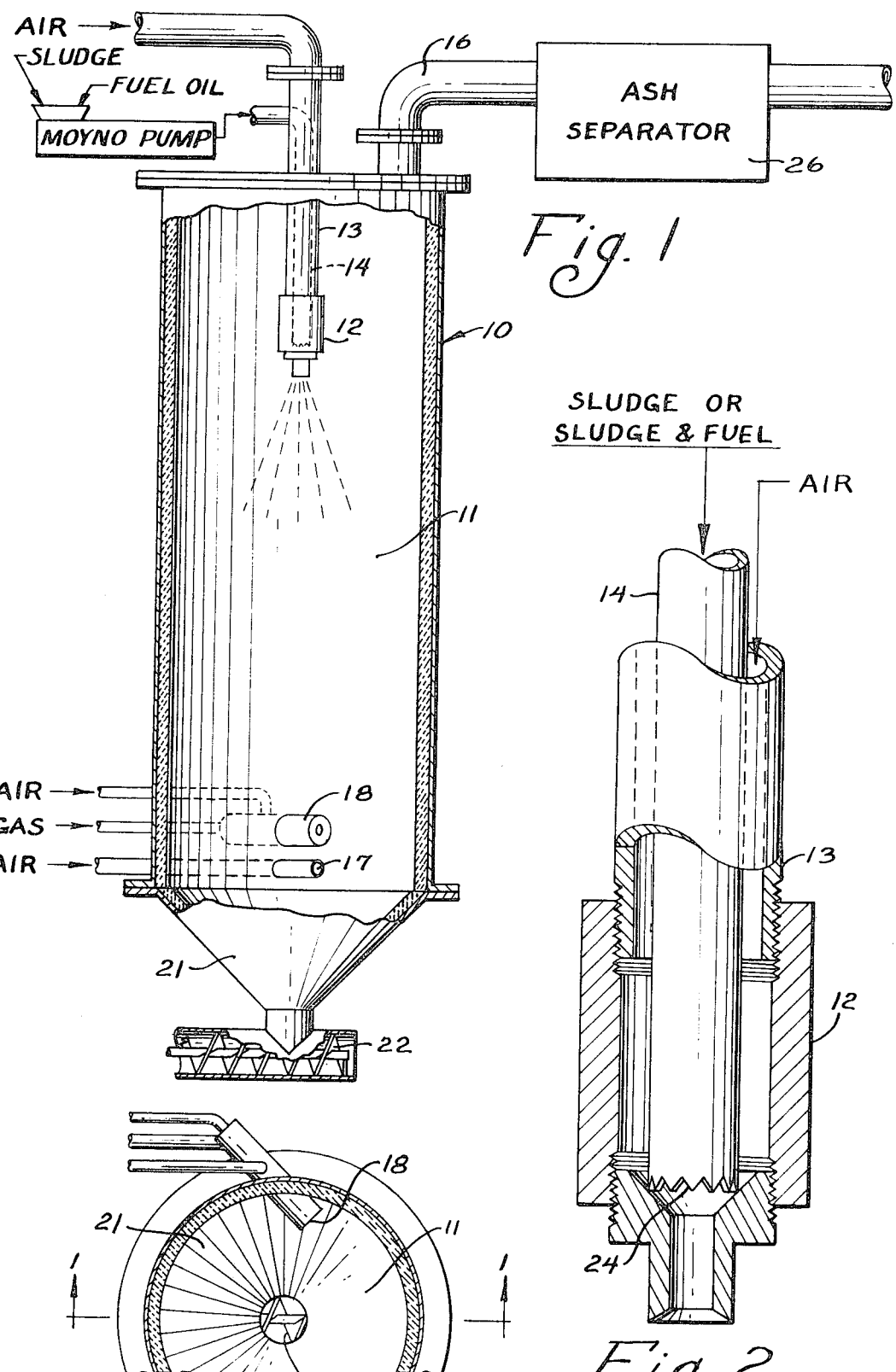

COUNTER-FLOW SLUDGE BURNER

INTRODUCTION

The invention of which the present disclosure is offered for public dissemination in the event that adequate patent protection is available relates to the burning of sludge from waste-treatment plants. Waste-treatment sludge has already been burned extensively, and various types of burners have been used. However, sludge burners heretofore have not been well suited for relatively small waste-treatment plants. The present invention is believed to be adaptable for the burning of relatively small quantities of sludge so as to provide the smaller municipalities or industries with a means for ultimate disposal of the residual sludge from its waste-treatment plant. The capacity of a small sludge burner according to the present invention has been found to be surprisingly high, however, and the invention may prove to be more efficient or less troublesome for the larger plants where the sludge burning of large throughputs has heretofore seemed to be reasonably satisfactory. The present invention also pumps and kneads a mixture of sludge cake and fuel oil or grease to achieve economy of power and fuel.

The improved reaction environment for incineration of sludge according to the present invention and its greatly enhanced thermal economy may significantly reduce the amount of external fuel required for the incineration process. These and other advantages may be more apparent from the following description and from the drawings.

DESIGNATION OF DRAWING FIGURES

FIG. 1 of the drawings is a diagrammatic representation, in the nature of a vertical sectional view, of a waste-sludge burner embodying the present invention.

FIG. 2 is a side view of the feed line, partly in section to show a dispersion nozzle such as represents the preferred use of the invention.

FIG. 3 is a fragmentary horizontal sectional view through the burner of FIG. 1, looking downwardly.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION OF THE INVENTION

As seen in FIG. 1 the burner 10 includes a firebox section 11 into which sludge is dispersed near the top, the illustrated form of dispersal being by a two-phase nozzle 12. Sludge, or sludge mixed with added fuel, is supplied to its inner conduit 14 and air for breaking up and dispersing the sludge is supplied through the outer conduit 13.

The stack or outflow conduit 16 is located at or near the top of the burner 10, so that there will be an upward flow of the gases within the firebox 11. This upward flow is enhanced by introducing at the bottom of the firebox 11 all of the air needed for combustion other than that which is used for breaking up and dispersing the sludge. This air is preferably admitted through a nozzle 17 which is somewhat tangentially directed, as illustrated, to impart a swirling motion to the gaseous contents of firebox 11.

A burner 18 is also similarly located and disposed near the bottom of the firebox 11. Before commencing the supply of sludge through nozzle 12, fuel and air are supplied to burner 18, and supplemental air to air nozzle 17, to preheat the firebox 11 to a temperature sufficiently high so that when sludge and air are sprayed through nozzle 12 the sludge will be dried and fully incinerated in a free falling state or as a free dispersion, i.e., without any substantial deposition of sludge on the floor of the firebox 11. At the bottom of the firebox 11 there is provided a hopper 21, but the particles which fall into this hopper are mainly sand and other unburnable residues of relatively large and heavy type. In case there may be much of this, a screw discharge unit 22 may be provided. It serves as a closure, whether driven continuously by power, or occasionally by hand. Otherwise the throat of hopper 21 may normally be kept closed by a manually openable door.

The sludge supplied to conduit 14 will be sludge from which most of the water has been removed as by a vacuum filter. It may still have a water content of from 50 to 57 80 percent, however. The need for supplementary fuel (after preheating) will largely depend upon the moisture content. The sludge is fed uniformly, and may be fed by a progressing-cavity pump such as the Moyno pump. The downward momentum of the particles as they leave the feed nozzle 12 aids gravity in causing the particles to move downwardly. There is no need to expend power on achieving an extremely fine dispersion, since quick reversal to move upwardly is not desired. Dispersions to a particle size from about ¼ to 1 inch, referring to the longest dimension, is now preferred. Of course it must be expected that a small proportion of the total material will be in the form of finer particles.

Serrated edge 24 forming one side of the flow passage from conduit 13 to the nozzle orifice is optional, but may be preferred over a uniform annular spacing where flow volume is small and might otherwise be circumferentially unbalanced.

The downwardly moving particles are first dried and then incinerated, constantly losing weight. When reduced to ash, if not before, their movement will be reversed by the upwardly flowing gases and they will be swept through the stack 16 where they will be caught in an ash separator 26, diagrammatically indicated.

SPECIAL CONSIDERATIONS

According to the present invention, the flow of gases in the firebox 11 is upward, while the initial flow of sludge leaving the nozzle 12 is downward. It is important that the height of the outlet of nozzle 12 above the floor of the firebox 11 (which in the illustrated form is the inside surface of the hopper 21) be sufficient that under the conditions of operation there will be substantially no deposit of sludge on the floor. In other words, the present invention contemplates that substantially the entire sludge will be burned as dispersed free-falling particles. This makes it unnecessary to provide the troublesome fluid bed which has heretofore been characteristic of some of the best sludge burners. The term "free falling" is used in a relative sense, in that part of the time the movement is upward, but falling as compared to more rapidly rising gases.

Various factors contribute to achieving the condition of free-fall burning within the firebox. The most important are the sizes and initial downward speed of the particles of sludge after dispersion. With temperatures of 1,750° F to 1,800° F., and with an outflow of gases through stack 16 equivalent of an upward gas speed in firebox 11 of about 10 feet per second, two meters has been found to be sufficient for the spacing of the discharge part of nozzle 12 above the top of hopper 21.

It may also be desirable that the nozzle 12 be substantially below the top of the firebox 11 to ensure drying and burning of the small quantity of sludge which has a particle size small enough so that the movement of these particles is almost immediately reversed. There should be substantially complete incineration no later than entering the ash separator. A spacing of the outlet of nozzle 12 about 1 foot below the entry into stack 16, the latter having a length of about 3 feet to the ash separator, has been found to be sufficient when the particle dispersion by nozzle 12 has for the most part been coarse enough so that sludge burning was occurring substantially throughout the firebox 11. The burning of sludge throughout the firebox 11 only occurs, of course, if some of the particles or slugs of sludge are large enough after dispersion to fall against the current of the upwardly rising gases nearly to the bottom of the firebox before becoming light enough to be reversed in their movement, and blown upwardly by the gases.

The directing of the burner 18 and supplemental air jet 17 in a somewhat tangential direction so as to impart spin to the gases within the firebox 11 is deemed to be helpful by increasing the heat exchange between the gases and the sludge particles. This apparently reduces the required height of the nozzle 12 available for free fall of the particles. There was such spin present, when the dimensions mentioned were found satisfactory.

The reversal of the movement of the sludge particles according to the present invention greatly reduces the length of incinerator needed to achieve free-particle burning, with a given amount of power spent in dispersion. Prior free-particle burners in which the particles move from the dispersion nozzle in the same direction as the flow of gases have tended to require either greater length or more energy in dispersion to disperse the sludge into finer particles so that they would dry and burn more rapidly.

As illustrated diagrammatically in FIG. 1, fuel oil is preferably mixed with the sludge as fed to the Moyno pump and further mixed by it, and is carried with the sludge to burn in part far below the nozzle 12. The supply of this fuel can be regulated to maintain a temperature of 1,750° F to 1,800° F. in the firebox 11. The burner 18 may then be shut down, being used only for preheating.

Although good results can also be obtained by using burner 18 constantly, with regulation to maintain the stated temperature, and not adding fuel to the sludge, there is a significant advantage in adding to the sludge a fuel having lubricating properties, for example fuel oil. It makes pumping easier (very much easier when the filter cake is relatively dry) and hence saves power. It may also save fuel because the pump achieves good mixing, especially when there is the kneading action of a Moyno pump. The fuel burns in intimate mixture with the sludge, and largely without excess heat at one point, and so that there is minimum loss of some of the heat derived from the fuel.

Experience so far indicates that most activated sludge filter cake needs, for proper incineration, enough added fuel so that this fuel, if lubricative, can substantially ease the pumping of the filter cake. Grease skimmings, if reasonably well dewatered, or grease components of the sludge can serve as at least part of the lubricating fuel.

ACHIEVEMENT

Tests to date indicate that free-fall burning according to the present invention can achieve substantially complete burning of waste treatment sludge with relatively great efficiency and freedom from operating troubles. The ash recovered has no more than slight volatile-solid content.

I claim:

1. The method of burning waste-treatment sludge which comprises dispersing sludge into a firebox, with a downward direction of movement, while maintaining in the firebox a sludge-incinerating temperature and an upward flow of gases sufficient to reverse the movement of sludge particles in the firebox, such as to burn substantially the entire feed of sludge in free-fall conditions.

2. The method of burning waste-treatment sludge which comprises dispersing sludge into a firebox, with a downwardly directed blast of air giving the sludge a dispersed downward movement, while maintaining in the firebox a sludge-incinerating temperature and an upward flow of gases, such as to burn substantially the entire feed sludge in free-fall conditions; a substantial portion of this dispersed sludge being of a particle size to maintain its downward movement through the upwardly rising gases a substantial distance before reversal, and the temperature and upflow being sufficient to cause weight reduction of the sludge particles due to drying and burning, reversal of their movement in the firebox, and substantial completion of their incineration while entrained in the upwardly moving and outflowing gases.

3. The method of burning waste-treatment sludge which comprises dispersing sludge into a firebox, with a downward direction of movement, while maintaining in the firebox a sludge-incinerating temperature of about 1,750° F. to 1,800° F. and an upward flow of gases sufficient to reverse the movement of sludge particles in the firebox, such as to burn substantially the entire feed of sludge in free-fall conditions.

4. Apparatus for burning waste-treatment sludge including a firebox, means for dispersing sludge into the firebox with a downward direction of movement, and means for maintaining in the firebox a sludge-incinerating temperature and an upward flow of gases sufficient to reverse the movement of sludge particles in the firebox, such as to burn substantially the entire feed of sludge in free-fall conditions.

5. Apparatus for burning waste-treatment sludge including a firebox, means for dispersing sludge into the firebox with a downward direction of movement, and means for maintaining in the firebox a sludge-incinerating temperature and an upward flow of gases, such as to burn substantially the entire feed of sludge in free-fall conditions; the means for dispersing sludge being adapted to disperse a substantial portion of the sludge as particles of a size to maintain their downward movement through the upwardly rising gases a substantial distance before reversal, and the temperature and upflow being sufficient to cause weight reduction of the sludge particles due to drying and burning, reversal of their movement in the firebox, and substantial completion of their incineration entrained in the upwardly moving and outflowing gases.

6. Apparatus for burning waste-treatment sludge including means for pumping and mixing, means for feeding sludge filter-cake and lubricative fuel thereto, means for dispersing the pumped mixture into the firebox with a downward direction of movement, and means for maintaining in the firebox an upward flow of gases sufficient to reverse the movement of sludge particles in the firebox, such as to burn substantially the entire feed of sludge in free-fall conditions.

7. Apparatus for burning waste-treatment sludge including means for pumping and mixing, means for feeding sludge filter-cake and lubricative fuel thereto, and means for dispersing the pumped mixture into the firebox.

8. The method of burning waste-treatment sludge which comprises dispersing a mixture of fuel and sludge into a firebox, with a downwardly directed blast of air giving the mixture a dispersed downward direction of movement, while maintaining in the firebox a sludge-incinerating temperature and an upward flow of gases sufficient to reverse the movement of sludge particles in the firebox, such as to burn substantially the entire feed of sludge in free-fall conditions.

9. The method of burning waste-treatment sludge which comprises mixing a lubricative fuel with a sludge cake, pumping the mixture, dispersing the mixture into a fire-box, with a downwardly directed blast of air giving the mixture a dispersed downward direction of movement, while maintaining in the firebox a sludge-incinerating temperature and an upward flow of gases sufficient to reverse the movement of sludge particles in the firebox, such as to burn substantially the entire feed of sludge in free-fall conditions.

* * * * *

UNITED STATES PATENT OFFICE
CERTIFICATE OF CORRECTION

Patent No. 3,738,289     Dated June 12, 1973

Inventor(s) John E. Hanway, Jr.

It is certified that error appears in the above-identified patent and that said Letters Patent are hereby corrected as shown below:

In the ABSTRACT, 5th line, change "and" to -- the -- after "condition,".

In the ABSTRACT, 12th line, change "to" to -- of -- after "Addition".

Column 2, line 26, delete "57" before "80".

Column 5, lines 18 through 21 and column 6, line 1, delete claim 7 reading as follows: "7. Apparatus for burning waste-treatment sludge including means for pumping and mixing, means for feeding sludge filter-cake and lubricative fuel thereto, and means for dispersing the pumped mixture into the firebox."

Signed and sealed this 20th day of November 1973.

(SEAL)
Attest:

EDWARD M. FLETCHER, JR.
Attesting Officer

RENE D. TEGTMEYER
Acting Commissioner of Patents